US009960950B2

(12) United States Patent
Korhonen et al.

(10) Patent No.: US 9,960,950 B2
(45) Date of Patent: May 1, 2018

(54) APPARATUS, METHOD, SYSTEM AND COMPUTER PROGRAM PRODUCT FOR SERVER FAILURE HANDLING

(71) Applicant: NOKIA SOLUTIONS AND NETWORKS OY, Espoo (FI)

(72) Inventors: Jouni Korhonen, Riihimäki (FI); Anders Jan Olof Kall, Espoo (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days. days.

(21) Appl. No.: 14/391,208

(22) PCT Filed: Apr. 8, 2013

(86) PCT No.: PCT/EP2013/057290

§ 371 (c)(1),
(2) Date: Oct. 8, 2014

(87) PCT Pub. No.: WO2013/153022

PCT Pub. Date: Oct. 17, 2013

(65) Prior Publication Data

US 2015/0063126 A1 Mar. 5, 2015

(30) Foreign Application Priority Data

Apr. 11, 2012 (WO) ................ PCT/EP2012/056585

(51) Int. Cl.
*H04L 12/24* (2006.01)
*H04L 29/06* (2006.01)
*H04L 29/14* (2006.01)

(52) U.S. Cl.
CPC ...... *H04L 41/0604* (2013.01); *H04L 63/0892* (2013.01); *H04L 69/40* (2013.01)

(58) Field of Classification Search
CPC ......... H04W 12/06; H04L 69/40; H04L 12/24
See application file for complete search history.

(56) References Cited

U.S. PATENT DOCUMENTS

2007/0153995 A1* 7/2007 Fang .................... H04M 15/00 379/114.03
2007/0157308 A1* 7/2007 Bardsley .............. H04W 12/06 726/15
2012/0005523 A1* 1/2012 Korhonen .............. H04L 41/06 714/4.11

FOREIGN PATENT DOCUMENTS

WO WO 2010/121649 A1 10/2010

OTHER PUBLICATIONS

International Search Report and Written Opinion dated Jun. 21, 2013 corresponding to International Patent Application No. PCT/EP2013/057290.

(Continued)

*Primary Examiner* — Lakeram Jangbahadur
(74) *Attorney, Agent, or Firm* — Squire Patton Boggs (US) LLP

(57) ABSTRACT

Apparatus, method, system and computer program product for server failure handling A mechanism for a first apparatus is described. The mechanism comprising receiving, from a first apparatus, a first authentication request comprising an user identity and an identity of said first apparatus, wherein said first apparatus being capable for provide authentication related service with respect to said user identity; determining if a third apparatus, originally associated with said user identity for providing authentication related service, is available for providing said service; registering said first apparatus as the server associated with said user identity for providing authentication related service, if said third apparatus is not available; sending a response to said first apparatus to acknowledge the first authentication request.

16 Claims, 6 Drawing Sheets

201
203
A First AAA Server
204
A Second AAA Server
202
HSS
401
402
403
404
405
406
407
408
409
410

(56) References Cited

OTHER PUBLICATIONS

P. Calhoun et al., "Diameter Base Protocol," Network Working Group, RFC 3588, Sep. 2003, 113 pages.
3GPP TS 29.273 V11.1.0 (Mar. 2012), Technical Specification, 3rd Generation Partnership Project; Technical Specification Group Core Network and Terminals; Evolved Packet System (EPS); 3GPP EPS AAA Interfaces (Release 11), Mar. 2012, 120 pages.

* cited by examiner

Network Architecture

203
A First
AAA Server
PDN-GW/ePDG/
Trusted/Untrusted Access/
AAA Proxy
201
202
HSS
204
A Second
AAA Server 201
203
204
202
A First
AAA Server
A Second
AAA Server
HSS
301
302
303
304
305
306
307
308
309

APPARATUS, METHOD, SYSTEM AND COMPUTER PROGRAM PRODUCT FOR SERVER FAILURE HANDLING

FIELD OF THE INVENTION

The present invention relates to server failure handling. More specifically, the present invention relates to methods, apparatuses, system and computer program product for server failure handling.

BACKGROUND OF THE INVENTION

In a Communication network such as Global System for Mobile Communications (GSM, often called 2G), Universal Mobile Terrestrial System (UMTS, often called 3G), LTE (Long Term Evolution) network, WLAN (Wireless Local Access Network) networks or HRPD (High Rate Packet Data) networks, AAA servers may provide functionality of Authentication, Authorization and Accounting to both operators and subscribers. FIG. 1 illustrates a network architecture comprising one or more AAA servers. A UE (User Equipment) may be connected to a packet data communication network via the PND-GW (Packet Data Network-Gateway). The UE using a 3GPP ($3^{rd}$ Generation Partnership Project) access network is connected to the PDN-GW via the so-called SGW (Serving GateWay). The UE using a so-called untrusted non-3GPP access network, e.g. WLAN, is connected to the PDN-GW via the ePDG (evolved Packet Data Network-Gateway). The UE using a so-called trusted non-3GPP access network, e.g. HRPD or WLAN, is connected to the PDN-GW via an access gateway (not shown in the figure) inside the trusted non-3GPP access network. The UE's data connections are shown by solid lines and the corresponding radio connections with double-dotted lines in FIG. 1.

The network entities described above are also connected to the AAA Server (or Proxy AAA Server) in order to request authentication of the UE. The AAA Server in turn may be connected to a HSS (Home Subscriber Server) in order to request authentication information for the UE or to request subscriber information associated with the UE. The signaling connections to and from the AAA Server are shown by solid lines in FIG. 1.

In the case of roaming situation (i.e. when a UE has left its home network and is residing in a visited network), PND-GW, ePDG, untrusted non-3GPP access network and Trusted non-3GPP access network may be connected to the AAA servers via a proxy AAA server as shown by the dashed lines in FIG. 1.

In reality, an AAA server (e.g. a first AAA server 203) may fail, either temporarily or for a longer period, as shown in FIG. 2. In order to minimize the impact of the failure, any affected network entity 201 may resort to the service from an alternative AAA server (e.g. a second AAA server 204). The affected network entity 201 may be any of a PND-GW, an ePDG, a network element within an untrusted non-3GPP access network or a network element within a trusted non-3GPP access network in non-roaming situation or a proxy AAA server in roaming situation.

FIG. 3 further depicts the details of the failure situation. Assuming an AAA server, e.g. the first AAA server 203, suddenly fails as shown in 301. An access indication or authentication request 302 comprising a user identity, e.g. IMSI (International Mobile Subscriber Identity), associated with an UE (not shown in FIG. 2) arrives at the network entity 201. Said network entity 201 may send a corresponding authentication request 303 comprising the user identity to an AAA server (e.g. the first AAA server 203), which is associated with the user identity, as it is not aware that the first AAA server 203 has failed. Consequently, no response will be received from the first AAA server 203, which may, e.g. trigger a timer 304. When the timer expires, the network entity 201 may select an alternative AAA server, e.g. the second AAA server 204, and re-send the authentication request 305 comprising the user identity to that server. The second AAA server 204 may send a corresponding authentication message 306 comprising the user identity and its own server ID (also called server name) to the HSS 202. However, the HSS 202 is not aware of the failure of the first AAA server 203 either. After comparing the received server ID and the server ID stored in its database originally associated with the user identity it may inform the second AAA server 204 in step 307 that the first AAA server 203 is associated with the user identity and thus should handle the request. Accordingly, the second AAA server 204 may reply to the affected network entity 201 in step 308 that the first AAA server 203 should be used instead. The affected network entity 201 may try to send the authentication message to the failed AAA server 203 again as depicted in step 303 or simply determines that authentication request 303 has failed in step 209 and, as the result, the session is not established.

The failure of an AAA server 203 may also happen after a communication session associated with the user identity has been established. Re-authentication message may be triggered in step 302 and the failure of the first AAA server 203 may cause the session to be lost in the similar way as shown in the above example.

SUMMARY OF THE INVENTION

The present invention and its embodiments seek to address one or more of the above-described drawbacks and shortcomings.

According to an exemplary first aspect of the invention, there is provided a method for a first apparatus comprising receiving a first authentication request from a second apparatus, wherein said first authentication request is not relating to any ongoing session of said first apparatus and comprises an user identity and a first indication indicating connection failure between the second apparatus and a fourth apparatus which is associated with said user identity for providing authentication related service; concluding, based on the received first authentication request, said fourth apparatus has failed; sending a second authentication request to a third apparatus, wherein said second authentication request comprising said user identity and a second indication indicating the failure of said fourth apparatus.

According to one embodiment of the invention, the method further comprises receiving a first response from said third apparatus and sending a second response to said second apparatus.

According to another embodiment of the invention, wherein said first indication is the T-flag.

According to another aspect of the invention, there is provided a method for a second apparatus comprising receiving, from a first apparatus, a first authentication request comprising an user identity and an identity of said first apparatus, wherein said first apparatus being capable for provide authentication related service with respect to said user identity; determining if a third apparatus, originally associated with said user identity for providing authentication related service, is available for providing said service; registering said first apparatus as the server associated with said user identity for providing authentication related service, if said third apparatus is not available; sending a response to said first apparatus to acknowledge the first authentication request.

According to further development of the invention, wherein said first authentication request comprises a first indication indicating the failure of the third apparatus and said identity of the first apparatus being different from an identity of the third apparatus.

According to further modification of the invention, the method for the second apparatus further comprises receiving a second indication from a fourth apparatus indicating the failure of said third apparatus.

According to another embodiment of the invention, wherein determining if said third apparatus is available comprises attempting to connect to said third apparatus periodically and checking if any response is heard from said third apparatus.

According to a third embodiment of the invention, the method for the second apparatus further comprises removing the registration of said third apparatus from said second apparatus if it is determined that said third apparatus is not available for providing authentication related service.

According to a third aspect of the invention, there is provided a first apparatus comprising a processor, a memory unit, a receiver and a transmitter, wherein said receiver is configured to receive a first authentication request from a second apparatus, wherein said first authentication request is not relating to any ongoing session of said first apparatus and comprises an user identity and a first indication indicating the connection failure between the second apparatus and a fourth apparatus which is associated with said user identity for providing authentication related service; said processor is configured to conclude, based on the received first authentication request, said fourth apparatus has failed; said processor is further configured to send a second authentication request to a third apparatus via said transmitter, wherein said second authentication request comprising said user identity and a second indication indicating the failure of said fourth apparatus.

According to one embodiment of the invention, wherein said receiver of the first apparatus is further configured to receive to a first response from said third apparatus and said processor is further configured to send a second response to said second apparatus via said transmitter.

According to another embodiment of the invention, wherein said first indication is T-flag.

According to a fourth aspect of the invention, there is provided a second apparatus comprising a processor, a memory unit, a receiver and a transmitter, wherein said receiver is configured to receive, from a first apparatus, a first authentication request comprising an user identity and an identity of said first apparatus, wherein said first apparatus being capable for provide authentication related service with respect to said user identity; said processor is configured to determine if a third apparatus, originally associated with said user identity for providing authentication related service, is available for providing said service, register said first apparatus as the server associated with said user identity for providing authentication related service, if said third apparatus is not available, and send a response to said first apparatus to acknowledge the first authentication request.

According to one embodiment of the invention, wherein said first authentication request comprises a first indication indicating the failure of said third apparatus and said identity of the first apparatus being different from an identity of the third apparatus.

According to another embodiment of the invention, said receiver of the second apparatus is further configured to receive a second indication from a fourth apparatus indicating the failure of said third apparatus.

According to a third embodiment of the invention, wherein in order to determine if said third apparatus is available, said processor of the second apparatus is further configured to attempt to connect to said third apparatus periodically and to check if any response is heard from said third apparatus.

According to further development of the invention, wherein said processor of the second apparatus is further configured to remove the registration of said third apparatus from said second apparatus if it is determined that said third apparatus is not available for providing authentication related service.

According to a fifth aspect of the invention, there is provided a computer program product for a first apparatus comprising means for receiving a first authentication request from a second apparatus, wherein said first authentication request is not relating to any ongoing session of said first apparatus and comprises an user identity and a first indication indicating connection failure between the second apparatus and a fourth apparatus which is associated with said user identity for providing authentication related service; means for concluding, based on the received first authentication request, said fourth apparatus has failed; means for sending a second authentication request to a third apparatus, wherein said second authentication request comprising said user identity and a second indication indicating the failure of said fourth apparatus.

According to a sixth aspect of the invention, there is provided a computer program product for a second apparatus comprising means for receiving, from a first apparatus, a first authentication request comprising an user identity and an identity of said first apparatus, wherein said first apparatus being capable for provide authentication related service with respect to said user identity; means for determining if a third apparatus, originally associated with said user identity for providing authentication related service, is available for providing said service;

means for registering said first apparatus as the server associated with said user identity for providing authentication related service, if said third apparatus is not available; means for sending a response to said first apparatus to acknowledge the first authentication request.

Embodiments of the present invention may have one or more of following advantages. As shown in FIG. 4, one embodiment of the invention does not require any changes to the signalling of the interface (also called SWx interface) between an AAA Server (e.g. the first/second AAA server 203/204) and an HSS (e.g. HSS 202).

The embodiments of the invention shown in FIG. 4 and FIG. 5 may ensure that a session with respect to a user identity will be established or an established session will be maintained even if the AAA server originally associated with the user identity has failed.

BRIEF DESCRIPTION OF THE DRAWINGS

Exemplary embodiments of the invention are described below, by way of example only, with reference to the following numbered drawings.

DESCRIPTION OF THE EMBODIMENTS OF THE INVENTION

Figure 1:
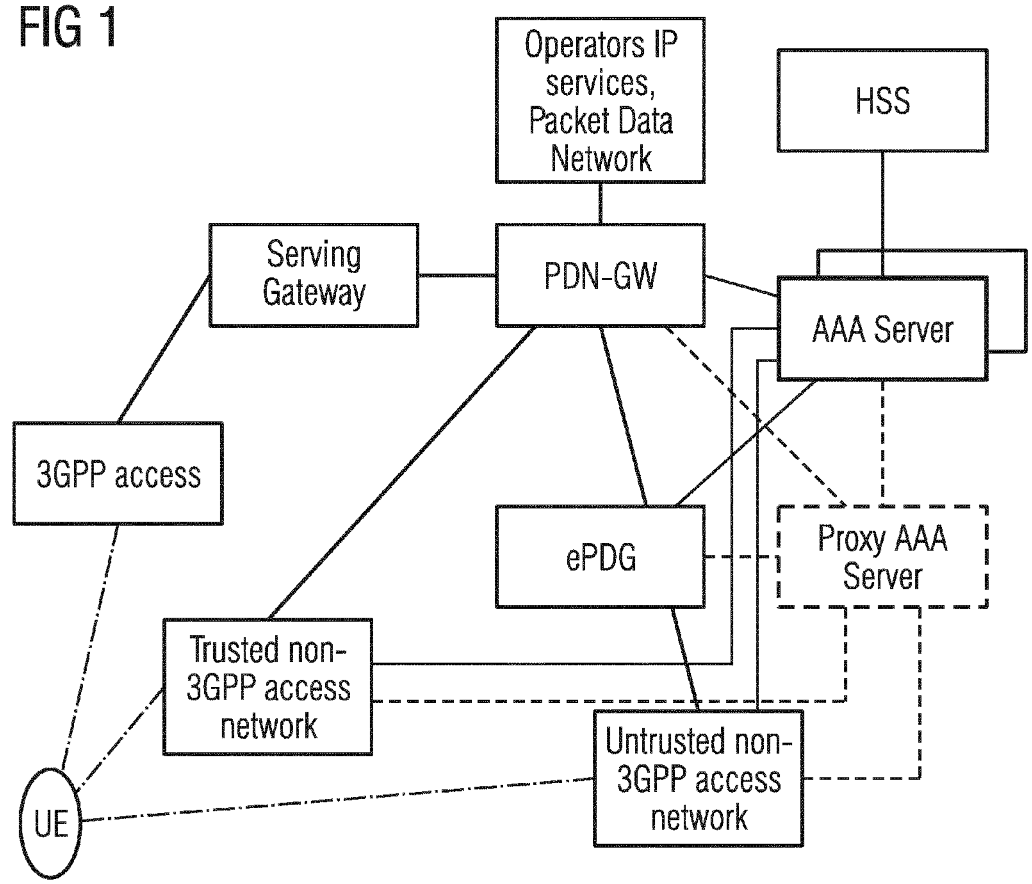
FIG. 1 is based on the applicable 3GPP specifications and illustrates an exemplary overview of the network architecture relevant to the invention.
Figure 2:
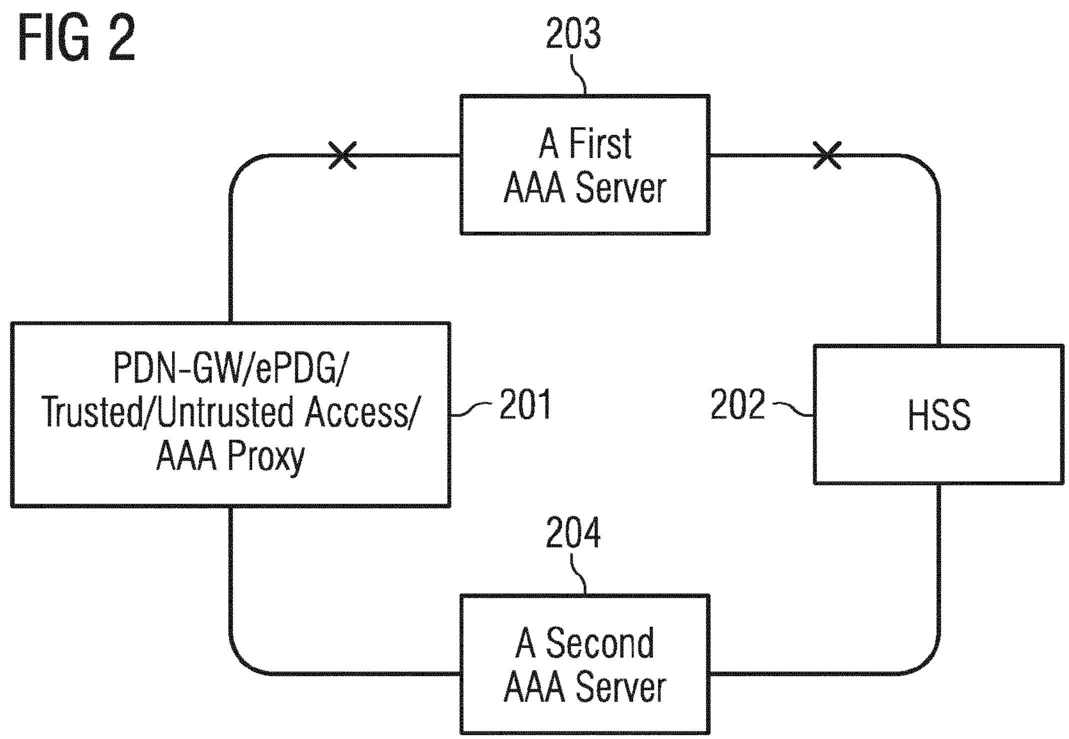
FIG. 2 illustrates a situation where an AAA Server fails to function.
Figure 3:
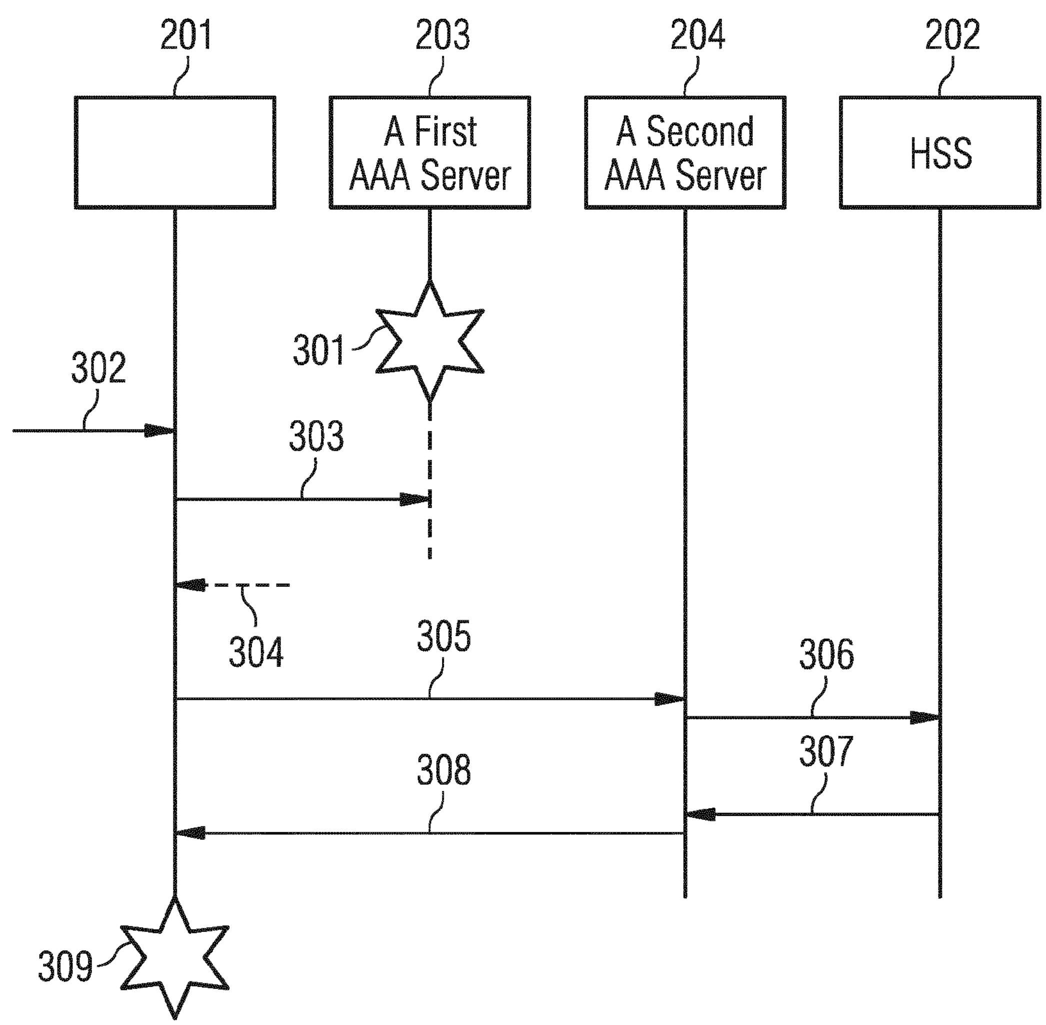
FIG. 3 illustrates the failure situation in detail.
Figure 4:
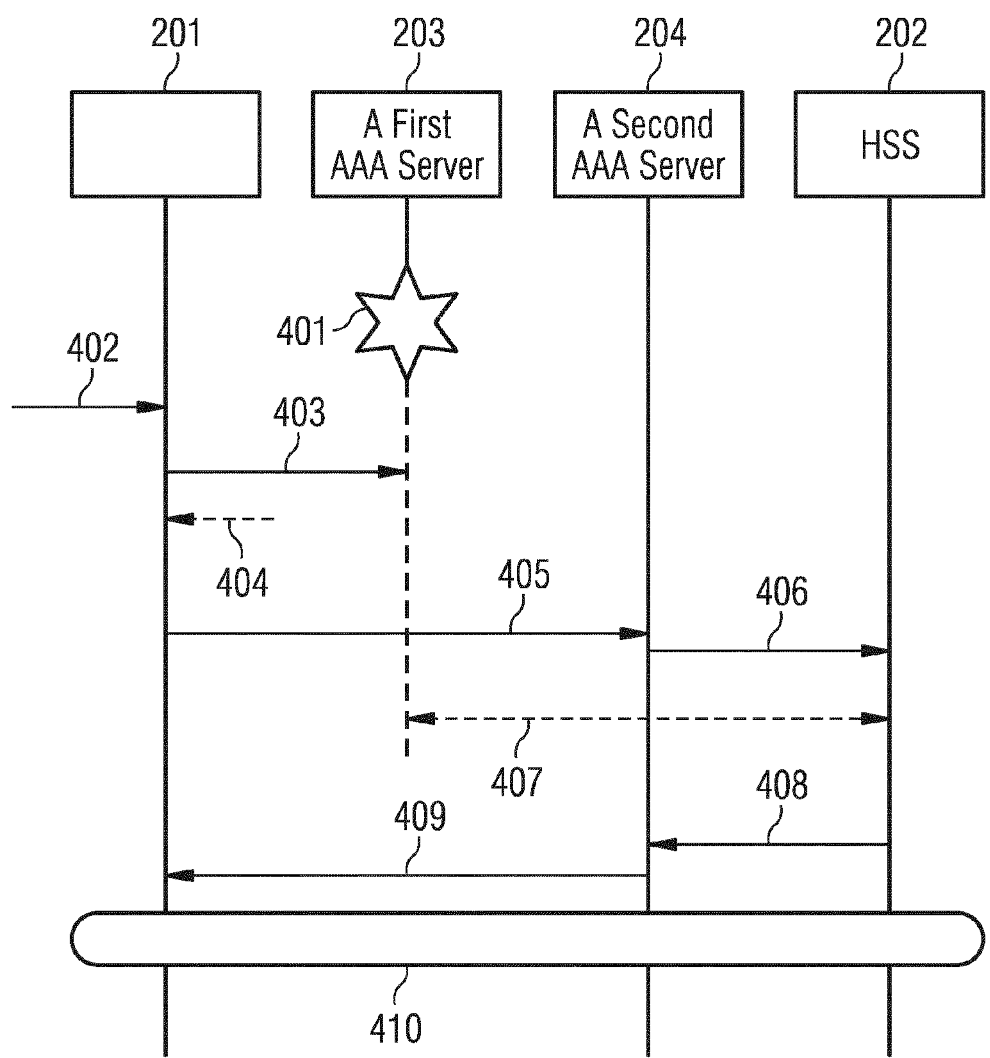
FIG. 4 shows a solution according to one aspect of the invention.

FIG. 4 shows a solution according to one aspect of the invention. The steps 401 to 406 in FIG. 4 are identical to the steps 301 to 306 in FIG. 3. According to one aspect of the invention, upon receiving the authentication request 406 comprising the user identity and the server ID of the second AAA server 204, the HSS 202 may determine the status of the AAA server (e.g. first AAA server 203) associated with (or assigned to) the user identity in step 407. If the HSS 202 determines that the first AAA server 203 has failed, it may clear (or remove) the first AAA Server 203 registration from its database and register in its database the AAA server (e.g. second AAA server 204) sending the message 406 as the AAA server associated with the user identity. If the HSS 202 cannot find any AAA server associated with the user identity from its database, it may register the AAA server (e.g. the second AAA server 204) sending the message 406 in its database as the AAA server associated with the user identity.

According to one embodiment of the invention, the HSS 202 may detect if an AAA server has failed or not by checking the transmission link with that AAA server, e.g. the first AAA server 203. The HSS 202 may attempt to connect to the first AAA server 203 periodically, e.g. every 30 s. No response to such an attempt may suggest that the first AAA server 203 has failed.

According to another embodiment of the invention, ICMP (Internet Control Message Protocol) may be deployed in the transmission link layer between an AAA server, e.g. the first AAA server 203, and the HSS 202. In this case the HSS 202 may receive an ICMP indication from an intermediate network entity (not shown in the figure) that the AAA server is not reachable when the first AAA server 203 is down.

According to a further embodiment of the invention the HSS 202 may clear (or remove) the registration of an AAA server from its database if the HSS 202 has determined that the AAA server is down.

Said HSS 202 may send an acknowledgement message 408 to the second AAA server 204. Consequently, the second AAA server 204 may also acknowledge the authentication request to the network entity 201 in step 409. After receiving a positive acknowledgement message 409 from the second AAA server 204, a data communication session 410 associated with the user identity may be established.

As stated above, the failure of an AAA server, e.g. the first AAA server 203, may also happen after a communication session associated with the user identity has been established and in such a case a re-authentication may be triggered in step 402 instead. With the solution described above, the loss of the communication session may be avoided.

Figure 5:
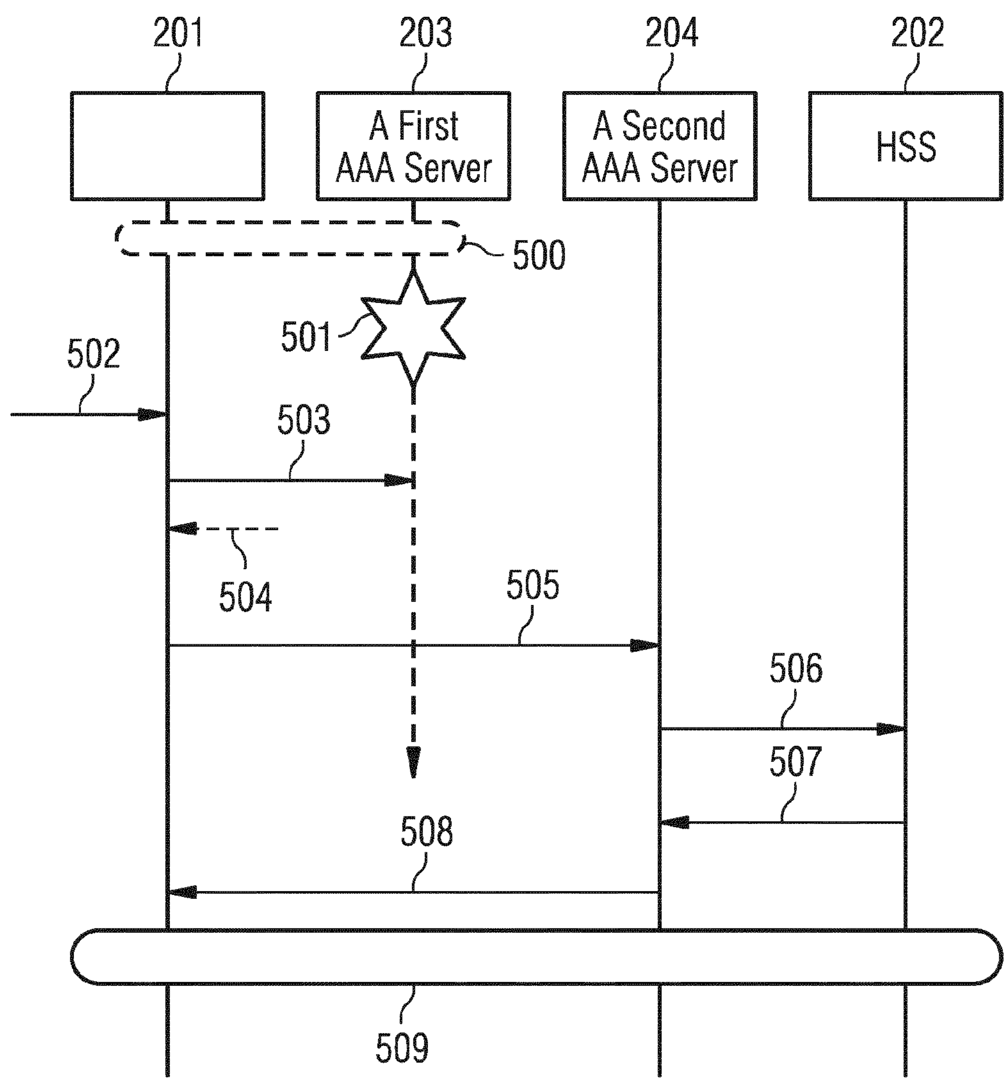
FIG. 5 shows another solution according to another aspect of the invention.

FIG. 5 illustrates another situation according to another aspect of the invention. The steps 501 to 504 in FIG. 5 are identical to the steps 301 to 304 in FIG. 3. When the timer 504 expires, the network entity 201 may realize that the first AAA server 203 is not responding to the request 503. The network entity 201 may then send an authentication request 505 comprising the user identity (e.g. IMSI) associated with the UE (not shown in FIG. 5) to a newly selected AAA server, e.g. the second AAA server 204. As there is no session established previously between the network entity 201 and the second AAA server 204, the request 505 may contain a session ID that is different from any ongoing session of the second AAA server 204. In other words, the request 505 is not relating to any ongoing session of the second AAA server 204.

According to IETF RFC 3588, in the event that a network element, e.g. the network entity 201, has detected a transport failure with a peer, for instance the first AAA server 203, it may forward all its pending request messages to an alternate agent (such as the second AAA server 204), if possible. This is commonly referred to as failover, which may be indicated by the so-called T-flag, an information element in Diameter signaling according to IETF RFC 3588, which is used to indicate that a network transport failure has been detected. The authentication request 505 therefore may contain the T-flag to indicate the failure of transport connection between the sender (i.e. network entity 201) of the message 505 and its peer, i.e. the AAA server (e.g. the first AAA server 203) originally associated with the user identity.

According to one embodiment of the invention, an AAA server such as the second AAA server 204 may conclude that the AAA server (e.g. the first server 203) originally associated with the user identity has failed because the request 505 comprises the T-flag being set and it is not relating to any ongoing session of the second AAA server 204. The second AAA server 204 shall not forward the T-flag as such to the HSS 202 when sending the message 506 because there is no network transport failure on the signaling link between the sender (i.e. the second AAA server 204) of the message 506 and its peer, i.e. the network entity 201.

According to one embodiment of the invention, the second AAA server 204 may send an authentication request message 506 to the HSS 202. The message 506 may comprise the identity of the sender (e.g. the second AAA server 204) and an indication specifically indicating the failure of the AAA server (e.g. the first AAA server 203) originally associated with the user identity. The information element may be named as "original AAA Server Down", for instance. If the information element is set, it means that the AAA server (e.g. the first AAA server 203) originally associated with (or previously assigned to) the user identity, but not the AAA server (e.g. the second AAA server 204) sending the message, may have failed. The information element may be mapped to Diameter AVP (Attribute Value Pair) using the same name.

Upon receiving the modified authentication request message 506, the HSS 202 may check if the identity (e.g. server name) of the sender contained in the request 506 is the same as the identity of the AAA server (e.g. the first AAA server 203) previously assigned to the user identity. If they are different and the request comprises the above-mentioned information element, the HSS 202 may conclude that the AAA server (e.g. the first AAA server 203) originally associated with the user identity is down. Then the HSS 202 may clear (or remove) the registration of the first AAA server 203 from its database and register in its database the second AAA server 204 as the AAA server associated with the user identity. The HSS 202 may acknowledge the modified authentication request 506 to the second AAA server 204 in step 507. Consequently, the second AAA server 204 may acknowledge the authentication request 505 to the network entity 201 in step 508 and a session associated with the user identity may be established as shown in 509.

As explained previously, the failure of an AAA server may also happen after a communication session associated with the user identity has been established between an UE (not shown in FIG. 5) and the first AAA server 203 as shown in 500. In such a case a re-authentication may be triggered in step 502 instead. There is no change in the rest of the messages as the authentication request 505 is not relating to any ongoing session of the second AAA server 204 anyway. With the solution described above, the loss of the communication session may be avoided.

Figure 6:
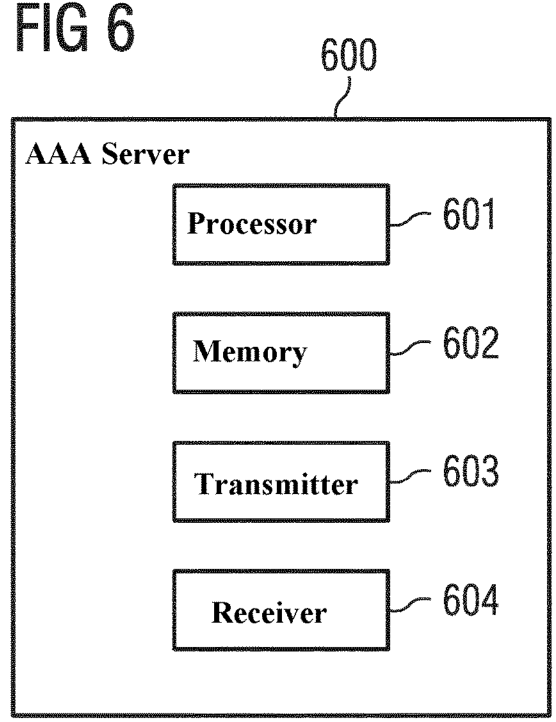
FIG. 6 depicts a schematic block diagram illustrating an apparatus according to a further aspect of the invention.

FIG. 6 shows a schematic block diagram illustrating an apparatus 600 according to a further aspect of the invention. The apparatus may comprise a processor (or a processing means) 601, a memory unit 602, a transmitter (or a transmitting means) 603 and a receiver (or receiving means) 604. It may be noted that the receiver or transmitter may be an integral transceiver or separate functional entities. The memory unit may comprise a database (not shown in the figure). The apparatus 600 may be an AAA server such as the first/second AAA server 203/204.

The receiver 604 may receive the authentication/re-authentication request 405/505 comprising a user identity associated with a UE (not shown in the figure) from a network element, e.g. the network entity 201. According to one embodiment of the invention, the authentication request message 505 may comprise an indication such as the T-flag as described previously, indicating the failure of transport connection between the sender (e.g. network entity 201) of the message 505 and its peer, i.e. the AAA server (e.g. the first AAA server 203) originally associated with the user identity. As the request 505 is not relating to any ongoing session of the apparatus 600 and the T-flag is set, the processor 601 may conclude that the AAA server (e.g. the first AAA server 203) originally associated with the user identity has failed.

The processor 601 may send a corresponding authentication request message 406/506 comprising said user identity to the HSS 202 via the transmitter 603.

According to another embodiment of the invention, said corresponding authentication request message 506 may comprise an indication indicating the failure of the AAA server, e.g. the first AAA server 203, associated with the user identity. The indication may be an information element named as “original AAA server down” as described previously. Setting the information element means that the AAA server associated with (or previously assigned to) a user identity contained in the message, but not the server sending the message comprising the information element, is down.

Figure 7:
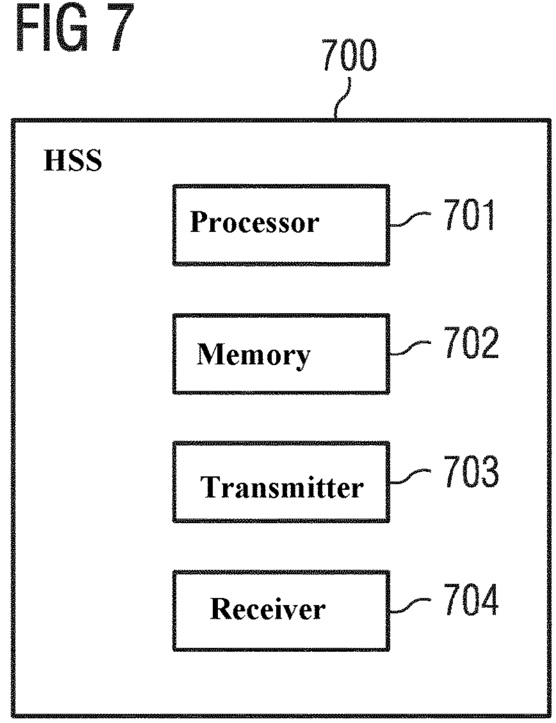
FIG. 7 depicts a schematic block diagram illustrating another apparatus according to a fourth aspect of the invention.

FIG. 7 shows a schematic block diagram illustrating an apparatus 700 according to a fourth aspect of the invention. The apparatus may comprise a processor (or a processing means) 701, a memory unit 702, a transmitter (or a transmitting means) 703 and a receiver (or receiving means) 704. It may be noted that the receiver or transmitter may be an integral transceiver or separate functional entities. Said memory unit may comprise a database (not shown in the figure). The apparatus 700 may be a HSS, e.g. the HSS 202.

The receiver 704 may receive, from an AAA server, e.g. the second AAA server 204, an authentication/re-authentication request, e.g. the request message 406/506, comprising an identity of the sender (e.g. the second AAA server 204) and a user identity associated with a UE (not shown in the figure). The processor may determine the status of the AAA server (e.g. the first AAA server 203) originally associated with the user identity. According to one embodiment of the invention, said processor may check the transmission link between the AAA server (e.g. the first AAA server 203) and the apparatus 700 in order to determine if the AAA server is down. The HSS 202 may attempt to connect to an AAA server such as the first AAA server 203 periodically, e.g. every 30 s. No response to such an attempt may suggest that the first AAA server 203 has failed.

According to another embodiment of the invention, an intermediate network entity (not shown) may notify the apparatus 700 that an AAA server, e.g. the first AAA server 203, is down.

According to a third embodiment of the invention, said processor 701 may clear (or remove) the registration of an AAA server from its database if the AAA server is deemed to be down.

According to a fourth embodiment of the invention, the request message 506 may comprise an indication indicating the failure of the AAA server, e.g. the first AAA server 203, associated with the user identity. The indication may be an information element named as “original AAA server down” as described previously. Setting the information element means that the AAA server originally associated with (or previously assigned to) the user identity contained in the message, but not the server sending the message comprising the information element, is down. The processor 701 may check if the identity of the sender (e.g. server name) contained in the request 506 is identical to the identity of the AAA server originally associated with the user identity. If they are different and the request also contains the indication indicating the failure of the original AAA server, the processor 701 may clear (or remove) the registration of the original AAA server from its database and register in its database the AAA server (e.g. the second AAA server 204) which sends the request 506 as the AAA server associated the user identity.

If the processor 701 cannot find an AAA server associated with the user identity from its database, it may register the AAA server (e.g. the second AAA server 204) sending the request 406/506 in its database as the AAA server associated the user identity.

If the processor 701 determines that an AAA server (e.g. the first AAA server 203) associated with the user identity is down, either based on transmission link check or an indication from an intermediate network entity (not shown in the figure) that the AAA server is not reachable, it may clear (or remove) the registration of that AAA server from its database and register the AAA server (e.g. the second AAA server 204) sending the request 406/506 in its database as the AAA server associated the user identity.

Throughout the description, when an AAA server is not reachable (i.e. it does not respond to a service request, e.g. an authentication request) with respect to an network entity (e.g. network entity 201), it may be described as “an AAA server is down”, “an AAA server has failed”, “connection failure between an AAA server and a network entity”, “AAA server is not available” or “the failure of an AAA server”.

According to a fifth aspect of the invention, when an AAA server (e.g. the second AAA server 204) receives a request message comprising the T-flag being set and the message is not relating to any ongoing session of the AAA server, the AAA server shall send an indication named e.g. “Original AAA Server Down” to an HSS (e.g. the HSS 202), indicating that the AAA server (e.g. the first AAA server 203) previously assigned to an subscriber is down.

According to a sixth aspect of the invention, when a HSS (e.g. the HSS 202) receives a message (e.g. 506) containing an indication, e.g. the AVP "Original AAA Server Down", indicating that an AAA server (e.g. the first AAA server 203) previously assigned to an subscriber is not reachable, the HSS may compare the identity (e.g. server name) of the sender of the message and the identity of the AAA server previously assigned to the subscriber. If they are different, the HSS may remove that AAA server name (or the server identity) from its database and store the AAA server name (or the server identity) of the alternate AAA server that sent the message containing the indication.

According to one embodiment of the invention, the "Original AAA Server Down" AVP may be of type Unsigned32 and it may contain a bit mask or be represented by a bit. When that bit is set, it may indicate that an AAA server previously assigned to an subscriber (or a user identity) may have failed.

For the purpose of the present invention as described above, it should be noted that

- method steps likely to be implemented as software code portions and being run using a processor at one of the server entities are software code independent and can be specified using any known or future developed programming language;
- method steps and/or devices likely to be implemented as hardware components at one of the server entities are hardware independent and can be implemented using any known or future developed hardware technology or any hybrids of these, such as MOS, CMOS, BiCMOS, ECL, TTL, etc, using for example ASIC components or DSP components, as an example;
- generally, any method step is suitable to be implemented as software or by hardware without changing the idea of the present invention;
- devices can be implemented as individual devices, but this does not exclude that they are implemented in a distributed fashion throughout the system, as long as the functionality of the device is preserved.

It is to be understood that the above description is illustrative of the invention and is not to be construed as limiting the invention. Various modifications and applications may occur to those skilled in the art without departing from the scope of the invention as defined by the appended claims.

The invention claimed is:

1. A method for a first apparatus, being an authentication apparatus, the method comprising:

- receiving a first authentication request from a second apparatus, wherein said first authentication request is not relating to any ongoing session of said first apparatus and comprises a user identity and a first indication indicating connection failure between the second apparatus and a fourth apparatus which is associated with said user identity for providing authentication related service;
- the authentication apparatus, having received the first authentication request, concluding, based on the received first authentication request, said fourth apparatus has failed;
- the authentication apparatus sending a second authentication request to a third apparatus; and
- the authentication apparatus providing authentication related service with respect to said user identity in place of the fourth apparatus in response to receiving the first indication,
- wherein said second authentication request comprises said user identity and a second indication indicating the failure of said fourth apparatus, and is to trigger the third apparatus to remove a registration of said fourth apparatus from said third apparatus if it is determined that said fourth apparatus is not available for providing authentication related service.

2. The method according to claim 1, further comprises receiving a first response from said third apparatus and sending a second response to said second apparatus.

3. The method according to claim 1, wherein said first indication is a T-flag.

4. A method for a second apparatus, the method comprising:

- receiving, from a first apparatus, a first authentication request comprising a user identity and an identity of said first apparatus and comprising a first indication indicating the failure of a third apparatus, wherein said first apparatus is configured to provide authentication related service with respect to said user identity;
- determining if the third apparatus, originally associated with said user identity for providing authentication related service, is available for providing said service;
- removing a registration of said third apparatus from said second apparatus if it is determined that said third apparatus is not available for providing authentication related service;
- registering said first apparatus as the server associated with said user identity for providing authentication related service, if said third apparatus is not available; and
- sending a response to said first apparatus to acknowledge the first authentication request.

5. The method according to claim 4, said identity of the first apparatus being different from an identity of the third apparatus.

6. The method according to claim 4, further comprises receiving a second indication from a fourth apparatus indicating the failure of said third apparatus.

7. The method according to claim 4, wherein determining if said third apparatus is available comprises attempting to connect to said third apparatus periodically and checking if any response is heard from said third apparatus.

8. A first apparatus, comprising:

- a processor, a memory unit, a receiver, and a transmitter,
- wherein said receiver is configured to receive a first authentication request from a second apparatus, wherein said first authentication request is not relating to any ongoing session of said first apparatus and comprises a user identity and a first indication indicating the connection failure between the second apparatus and a fourth apparatus which is associated with said user identity for providing authentication related service;
- said processor is configured to conclude, having received the first authentication request, based on the received first authentication request, said fourth apparatus has failed;
- said processor is further configured to send a second authentication request to a third apparatus via said transmitter; and said processor is configured to provide authentication related service with respect to said user identity in place of the fourth apparatus in response to receiving the first indication, wherein said second authentication request comprises said user identity and a second indication indicating the failure of said fourth apparatus, and is to trigger the third apparatus to remove a registration of said fourth apparatus from said third apparatus if it is determined that said fourth apparatus is not available for providing authentication related service.

9. The apparatus according to claim 8, wherein said receiver is further configured to receive to a first response from said third apparatus and said processor is further configured to send a second response to said second apparatus via said transmitter.

10. The apparatus according to claim 8, wherein said first indication is a T-flag.

11. A second apparatus, comprising:

a processor, a memory unit, a receiver, and a transmitter, wherein said receiver is configured to receive, from a first apparatus, a first authentication request comprising a user identity and an identity of said first apparatus and comprising a first indication indicating the failure of a third apparatus, wherein said first apparatus is configured to provide authentication related service with respect to said user identity;

said processor is configured to determine if the third apparatus, originally associated with said user identity for providing authentication related service, is available for providing said service and to remove a registration of said third apparatus from said second apparatus if it is determined that said third apparatus is not available for providing authentication related service, register said first apparatus as the server associated with said user identity for providing authentication related service, if said third apparatus is not available, and send a response to said first apparatus to acknowledge the first authentication request.

12. The apparatus according to claim 11, said identity of the first apparatus being different from an identity of the third apparatus.

13. The apparatus according to claim 11, said receiver is further configured to receive a second indication from a fourth apparatus indicating the failure of said third apparatus.

14. The apparatus according to claim 11, wherein in order to determine if said third apparatus is available, said processor is further configured to attempt to connect to said third apparatus periodically and to check if any response is heard from said third apparatus.

15. A computer program for a first apparatus, the computer program embodied on a non-transitory computer readable medium, wherein the computer program, when executed by a processor, causes the processor to:

receive a first authentication request from a second apparatus, wherein said first authentication request is not relating to any ongoing session of said first apparatus and comprises a user identity and a first indication indicating connection failure between the second apparatus and a fourth apparatus which is associated with said user identity for providing authentication related service;

conclude, having received the first authentication request, based on the received first authentication request, said fourth apparatus has failed;

send a second authentication request to a third apparatus; and provide authentication related service with respect to said user identity in place of the fourth apparatus in response to receiving the first indication, wherein said second authentication request comprising said user identity and a second indication indicating the failure of said fourth apparatus, and is to trigger the third apparatus to remove a registration of said fourth apparatus from said third apparatus if it is determined that said fourth apparatus is not available for providing authentication related service.

16. A computer program for a second apparatus, the computer program embodied on a non-transitory computer readable medium, wherein the computer program, when executed by a processor, causes the processor to:

receive, from a first apparatus, a first authentication request comprising a user identity and an identity of said first apparatus and comprising a first indication indicating the failure of a third apparatus, wherein said first apparatus is configured to provide authentication related service with respect to said user identity;

determine if the third apparatus, originally associated with said user identity for providing authentication related service, is available for providing said service;

remove a registration of said third apparatus from said second apparatus if it is determined that said third apparatus is not available for providing authentication related service;

register said first apparatus as the server associated with said user identity for providing authentication related service, if said third apparatus is not available; and send a response to said first apparatus to acknowledge the first authentication request.

* * * * *